US011425635B2

(12) United States Patent
Zeng et al.

(10) Patent No.: US 11,425,635 B2
(45) Date of Patent: *Aug. 23, 2022

(54) SMALL CELL IDENTIFICATION USING MACHINE LEARNING

(71) Applicants: AT&T Intellectual Property I, L.P., Atlanta, GA (US); AT&T Mobility II LLC, Atlanta, GA (US)

(72) Inventors: Helen Zeng, San Ramon, CA (US); Ali Wahid, Roswell, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,792

(22) Filed: Jan. 12, 2021

(65) Prior Publication Data

US 2021/0136670 A1    May 6, 2021

Related U.S. Application Data

(63) Continuation of application No. 16/209,662, filed on Dec. 4, 2018, now Pat. No. 10,917,836.

(51) Int. Cl.
*H04W 48/16* (2009.01)
*H04W 72/04* (2009.01)
(Continued)

(52) U.S. Cl.
CPC .......... *H04W 48/16* (2013.01); *H04B 17/318* (2015.01); *H04W 24/10* (2013.01);
(Continued)

(58) Field of Classification Search
CPC ... H04W 48/16; H04W 24/10; H04W 52/242; H04W 72/0473; H04W 76/11;
(Continued)

(56) References Cited

U.S. PATENT DOCUMENTS 7,203,489 B2 * 4/2007 Saunders .............. H04W 16/18
455/67.11
7,489,905 B2 * 2/2009 Qi ......................... H04B 17/20
455/67.11

(Continued)

FOREIGN PATENT DOCUMENTS

WO   WO-2022017012 A1 * 1/2022

OTHER PUBLICATIONS

Non Final office action received for U.S. Appl. No. 16/209,662 dated May 1, 2020, 33 Pages.

*Primary Examiner* — Julio R Perez
(74) *Attorney, Agent, or Firm* — Amin, Turocy & Watson, LLP

(57) ABSTRACT

Small cell identification using machine learning is provided. A method can include extracting, by a device comprising a processor, signal strength information for a cell in a cellular communication network from user equipment log data; estimating, by the device, path loss information associated with the cell at respective distances based on the signal strength information for the cell, resulting in estimated path loss information; and, based on the estimated path loss information, optionally along with other information such as antenna transmission power, antenna transmission frequency band, percentage of user equipments having a distance to a base station within a threshold, maximum user (Continued)

equipment distance to a base station, etc., classifying, by the device, the cell as a type from a group of types of cells, the group comprising a macro cell and a small cell.

20 Claims, 11 Drawing Sheets

(51) Int. Cl.
  *H04W 52/24* (2009.01)
  *H04W 24/10* (2009.01)
  *H04W 76/11* (2018.01)
  *H04B 17/318* (2015.01)
  *G06N 20/00* (2019.01)

(52) U.S. Cl.
  CPC ..... *H04W 52/242* (2013.01); *H04W 72/0473* (2013.01); *H04W 76/11* (2018.02); *G06N 20/00* (2019.01)

(58) Field of Classification Search
  CPC ..... H04W 16/18; H04B 17/318; G06N 20/00; G06N 5/003; G06N 20/20; G06N 3/08; G06N 20/10
  See application file for complete search history.

(56) References Cited

U.S. PATENT DOCUMENTS

| | | | |
|---|---|---|---|
| 8,483,678 | B2 | 7/2013 | Kylvaja et al. |
| 8,725,167 | B2* | 5/2014 | Siomina ................ G01S 5/0036 455/456.2 |
| 9,380,583 | B1 | 6/2016 | Joung et al. |
| 9,635,566 | B2* | 4/2017 | Cui ........................ H04W 48/16 |
| 9,642,114 | B2 | 5/2017 | Fong et al. |
| 9,706,411 | B2 | 7/2017 | Goswami et al. |
| 9,749,075 | B2 | 8/2017 | Liao et al. |
| 9,848,338 | B2 | 12/2017 | Randall et al. |
| 9,888,431 | B2 | 2/2018 | Hwang et al. |
| 10,003,992 | B2 | 6/2018 | Agyapong et al. |
| 10,039,130 | B2 | 7/2018 | Lopez-Perez et al. |
| 10,455,364 | B2* | 10/2019 | Hill ........................ G06Q 30/02 |
| 10,917,836 | B2* | 2/2021 | Zeng ..................... H04W 24/10 |
| 2012/0236741 | A1* | 9/2012 | Xu ......................... H04W 52/40 370/252 |
| 2017/0111812 | A1 | 4/2017 | Lee et al. |
| 2018/0049112 | A1 | 2/2018 | Wang |

\* cited by examiner

| INDEX | TX PWR | FREQ | PL θ1 | PL θ2 | PL 100M | PL 500M | PL 1000M |
|---|---|---|---|---|---|---|---|
| 1 | 50.3 | 1900 | 10.409 | 35.638 | 81.684 | 106.594 | 117.322 |
| 2 | 50.4 | 1900 | 9.981 | 35.199 | 80.379 | 104.982 | 115.577 |
| 3 | 47.5 | 700 | 18.577 | 33.471 | 85.519 | 108.915 | 118.990 |

| INDEX | TX PWR | FREQ | PL 50M | PL 100M | PL 150M | PL 200M | PL 250M |
|---|---|---|---|---|---|---|---|
| 1 | 47.5 | 700 | -- | -- | -- | -- | 92.340 |
| 2 | 48.5 | 2100 | -- | -- | -- | 106.479 | 113.496 |
| 3 | 48.5 | 1900 | -- | 91.407 | 81.840 | 89.804 | 102.317 |

SMALL CELL IDENTIFICATION USING MACHINE LEARNING

RELATED APPLICATION

The subject patent application is a continuation of, and claims priority to, U.S. patent application Ser. No. 16/209,662 (now U.S. Pat. No. 10,917,836), filed Dec. 4, 2018, and entitled "SMALL CELL IDENTIFICATION USING MACHINE LEARNING," the entirety of which application is hereby incorporated by reference herein.

TECHNICAL FIELD

The present disclosure relates to cellular communication systems, and, in particular, to techniques for management and development of a cellular communication system.

DESCRIPTION OF DRAWINGS

FIG. 9 depicts an example data structure that can be utilized by the system of FIG. 8 in accordance with various aspects described herein.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include extracting, by a device including a processor, signal strength information for a cell in a cellular communication network from user equipment log data. The method can further include estimating, by the device, path loss information associated with the cell at respective distances based on the signal strength information for the cell, resulting in estimated path loss information. The method can additionally include, based on the estimated path loss information, classifying, by the device, the cell as a type from a group of types of cells, the group including a macro cell and a small cell.

In another aspect, a system as described herein can include a processor and a memory that stores executable instructions that, when executed by the processor, facilitate performance of operations. The operations can include extracting signal strength information for a cell in a cellular communication network from log data associated with a user equipment, estimating path loss information associated with the cell at respective distances based on the signal strength information for the cell, resulting in estimated path loss information, and based on the estimated path loss information, classifying the cell as one from a group of types of cells, the group including a macro cell and a small cell.

In a further aspect, a machine-readable storage medium as described herein can include executable instructions that, when executed by a processor, facilitate performance of operations. The operations can include extracting signal strength information for a cell in a cellular communication network from log data logged in connection with a user equipment, estimating path loss information associated with the cell at respective distances based on the signal strength information for the cell, resulting in estimated path loss information, and based on the estimated path loss information, classifying the cell as a type from a group of types of cells, the group including a macro cell and a small cell.

Figure 1:
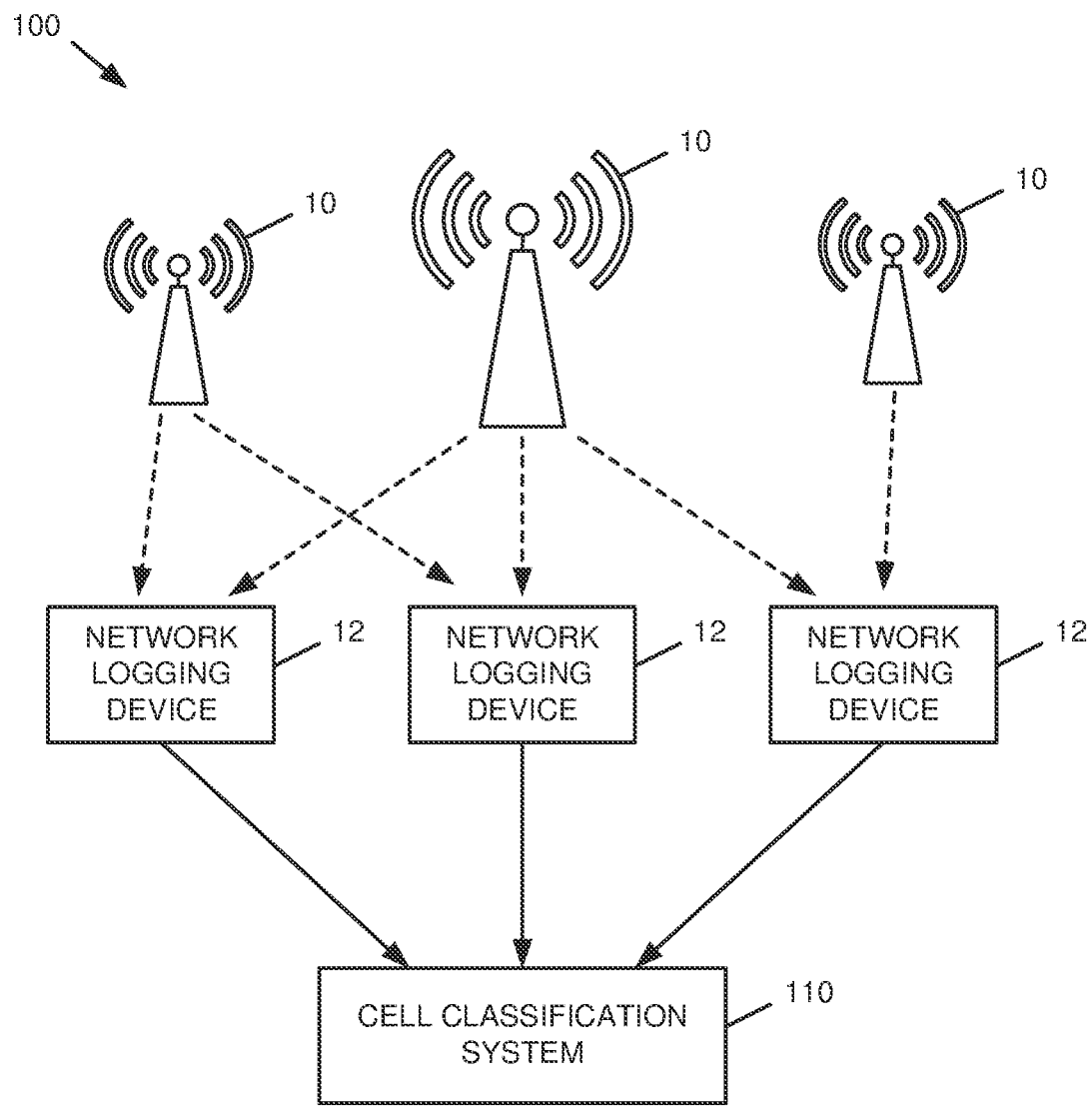
FIG. 1 is a diagram of an example cellular communication environment in which various aspects described herein can function.

Referring first to FIG. 1, diagram 100 illustrates an example cellular communication environment in which various aspects described herein can function. As shown in diagram 100, the cellular communication environment can include respective cells 10, which can each provide communication coverage for a corresponding geographic area. In various aspects, a cell 10 can be, or can include the functionality of, an access point, a base station, a Node B or an Evolved Node B (eNB), and/or any other suitable device(s). While the term "cell" can also be used to refer to the geographic area that is provided with communication coverage by such a device, it should be appreciated that the term "cell" as used herein refers only to the device that provides communication coverage for the area. For clarity of explanation, the area serviced by a given cell 10 is referred to as the coverage area for the cell 10.

In an aspect, cells 10 in a cellular network can vary in scale to provide coverage for differing areas having different needs or sizes. For instance, a cell 10 can be a macro cell, which can provide communication coverage for large urban or rural areas (e.g., at a coverage range of approximately 25 km or greater). Alternatively, a cell 10 can be a small cell, such as a micro cell or a pico cell, which can provide coverage for smaller areas than that associated with a macro cell. By way of non-limiting example, a micro cell can be utilized to provide communication coverage for an area approximately the size of one or more city blocks, and a pico cell can be used to provide communication coverage for an area approximately the size of one or more buildings. As used herein, the term "small cell" refers to both micro cells and pico cells, as well as any other suitable cell type (e.g., femto cells, etc.) that covers an area that is smaller than that associated with a macro cell.

In a cellular communication network such as the one depicted by diagram 100, it can be desirable to collect and/or maintain data pertaining to the network and its respective cells 10. For example, in the course of deploying new cells 10 to the network, changing configurations of existing cells 10, and/or otherwise managing the network, it can be desirable to obtain knowledge relating to the existing network landscape. This, in turn, can enable a network operator to better serve cellular users, e.g., by improving communication quality and/or overall user experience.

To the above and/or related ends, respective network logging devices 12 can be used to collect information regarding the network and its associated cells 10. In general, a network logging device 12 can be any user equipment (UE) and/or other device(s) having the ability to observe and record information relating to the network and/or respective cells 10 in the network. A network logging device 12 can be, for example, a drive test vehicle that is equipped with tools for analyzing and collecting data on respective cells 10 in its surrounding area. By way of example, information that can be collected by a network logging device 12 can include, but are not limited to, information relating to the frequency band(s) and/or bandwidth used by respective cells 10, transmit power utilized by respective cells 10, etc. Examples of these and other types of information, as well as techniques for using said information, are described in greater detail below.

Gathering information on a cellular communication network, such as by a drive test, can result in a very large amount of collected data. For instance, a single drive test can utilize a large number of network logging devices 12 that can collectively gather information over hundreds of thousands of miles of travel, which can span hundreds of cellular markets. Due to technical constrains as well as the limited nature of information available to individual network logging devices 12, it is not feasible for extensive data analysis to be performed in real-time during a drive test. As a result, a drive test can result in a vast amount of unprocessed data for subsequent analysis and classification. Due to the sheer scale of data collected by the network logging devices 12 on a typical drive test, a human would be unable to process any meaningful portion of the collected data in a useful or reasonable timeframe.

Accordingly, various aspects herein can utilize a cell classification system 110 that can receive data collected by respective network logging devices 12, e.g., via a drive test or other means, and utilize machine learning and/or other suitable techniques to perform useful analysis on the collected data. For instance, the cell classification system 110 can classify respective cells 10 in the network as macro cells or small cells based on the collected data. By way of specific, non-limiting example, information that can be utilized by the cell classification system 110 can include cell location, cell transmit power, path loss and/or distance to a given cell at respective locations, etc. Respective types of information that can be utilized by the cell classification system 110, as well as techniques for using such information, are described in more detail below.

Figure 2:
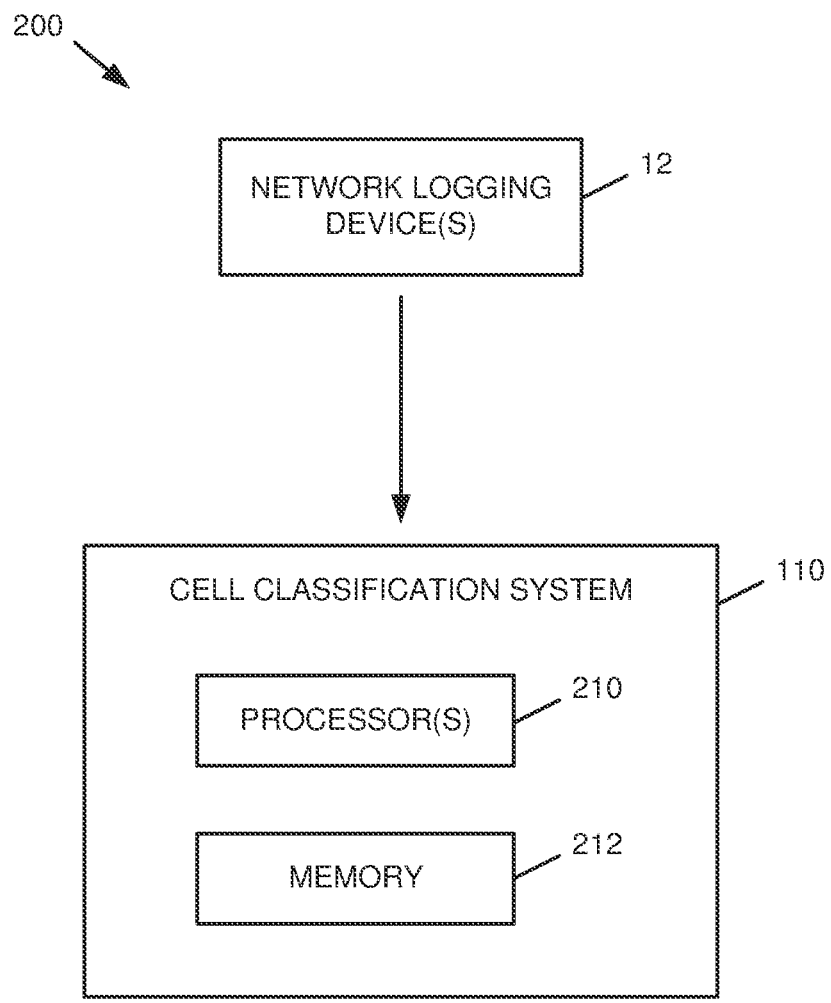
FIG. 2 is a block diagram of a system that facilitates small cell identification using machine learning in accordance with various aspects described herein.

Turning to FIG. 2, a block diagram of a system 200 that facilitates small cell identification using machine learning in accordance with various aspects described herein is illustrated. As shown by FIG. 2, the system 200 can include one or more network logging devices 12, which can collect information relating to cells of a cellular communication network (e.g., cells 10 as shown in diagram 100) and provide that information to a cell classification system 110. In an aspect, the network logging devices 12 can provide information to the cell classification system 110 in real time or near-real time, e.g., as that information is collected during the course of a drive test or other logging operation. Also or alternatively, the network logging devices 12 can provide collected information to the cell classification system 110 at the conclusion of logging.

As further illustrated by FIG. 2, the cell classification system 110 can include at least one processor 210 and a memory 212. In an aspect, the processor(s) 210 and memory 212 of the cell classification system 110 can be associated with a single computing device or distributed across multiple computing devices. For instance, in some embodiments the cell classification system 110 can include a cluster and/or other grouping of computing devices that each include one or more individual processors 210. In this manner, respective operations performed by the cell classification system 110 can be distributed among the different processors 210 and/or computing devices associated with the cell classification system 110. It should be appreciated, however, that in some embodiments the cell classification system 110 may not be a distributed system, and that other configurations are also possible.

In an aspect, the memory 212 of the cell classification system 110 can include volatile and/or non-volatile memory, each of which can be utilized for various purposes as appropriate. For instance, the memory 212 can store information received from the network logging device(s) 12 in connection with drive tests and/or other network analysis procedures. Additionally, the memory 212 can store computer-executable instructions that, when executed by the processor(s) 210, can cause the processor(s) 210 to execute one or more functions. Various examples of functions that can be performed by the processor(s) 210 of the cell classification system 110 in response to instructions provided by the memory 212 are provided below. For simplicity of explanation, these functions are described below in the context of computer-executable components that can be implemented, at least in part, by the processor(s) 210 in response to the appropriate instructions from the memory 212. It should be appreciated, however, that the various components described herein could be implemented at least partially in hardware in addition to software, e.g., via a processor 210 executing instructions stored by the memory 212.

Figure 3:
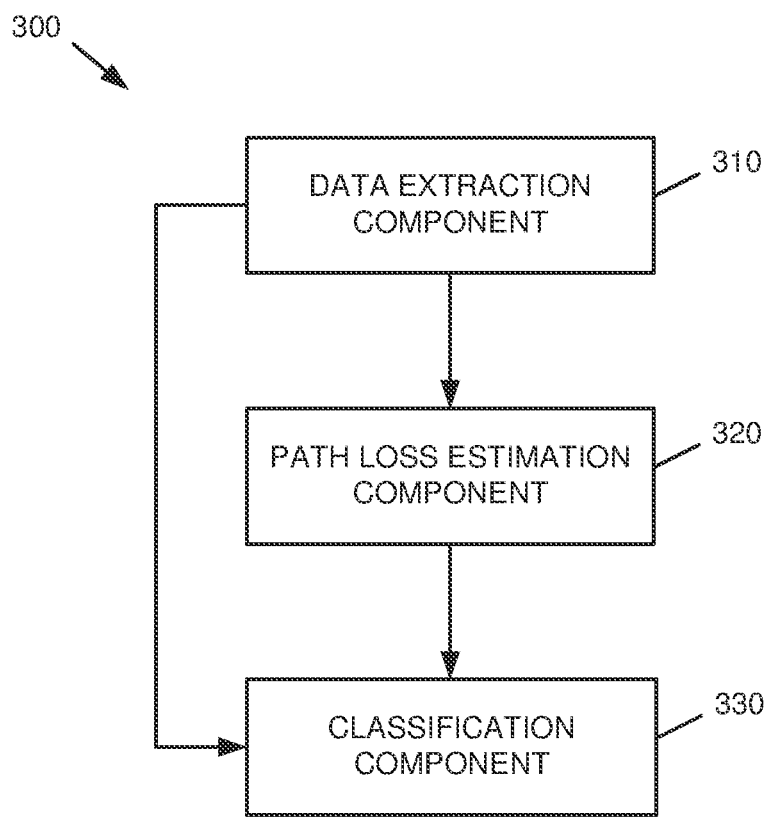
FIG. 3 is a block diagram of an example, non-limiting cell classification system in accordance with various aspects described herein.

With reference now to FIG. 3, a block diagram of an example system 300 for cell classification is illustrated. As shown by FIG. 3, system 300 can include a data extraction component 310, a path loss estimation component 320, and a classification component 330, which can be utilized by the cell classification system 110 and/or other suitable systems for classifying a cell given by network logging data as a macro cell or a small cell (e.g., a micro cell or a pico cell).

In an aspect, the data extraction component 310 can extract signal strength information and/or other information for a cell (e.g., a cell 10) in a cellular communication network from UE log data, e.g., data received from one or more network logging devices 12. Information obtained by the data extraction component 310 can include, but is not limited to, the geographic location of the cell (e.g., given by latitude and longitude, etc.), the geographic location of the corresponding network logging device 12 at the time of recording the information, UE-level reference signal parameters such as reference signal received power (RSRP) and/or reference signal received quality (RSRQ) for the cell and/or its neighboring cells, frequency information for the cell and/or its neighboring cells, or the like. In an aspect, frequency information for one or more network cells can be given in terms of channel information, e.g., as an evolved absolute radio frequency channel number (EARFCN) or similar indicators, which can be converted by the data extraction component 310 into a corresponding frequency or frequency band. Other cell-level information can also be collected by a network logging device 12 and/or extracted by the data extraction component 310.

Given the data for a cell as extracted by the data extraction component 310, the path loss estimation component 320 can estimate path loss information associated with the cell, e.g., at respective distances. Additionally, based on various types of information extracted by the data extraction component 310 as described above, other data can also be extracted including, but not limited to, the distance between the cell and a UE (e.g., a network logging device 12) associated with measurements of that cell, path loss to the serving cell, geometry of the serving cell, etc. In an aspect, the path loss estimation component 320 can derive other properties of a given network cell based on information received from the data extraction component 310 and/or other sources. For instance, based on reported data given by the data extraction component 310 as well as one or more cell databases, the path loss estimation component 320 can determine the transmit power used by a given network cell. Other types of information can also be derived.

Based on path loss information as estimated by the path loss estimation component 320, the classification component 330 can classify a given network cell as, e.g., a macro cell or a small cell. In an aspect, the classification component 330 can utilize data obtained by the data extraction component 310 and/or one or more other sources in addition to, or in place of, the estimated path loss data given by the path loss estimation component 320. For example, the classification component 330 can classify a network cell based at least in part on transmit power data for a network cell as extracted by the data extraction component 310 from UE log data, e.g., since in some cases a small cell can utilize lower transmit power levels than that of a macro cell. In another example, the classification component 330 can estimate a geometry of a network cell based on UE log data extracted by the data extraction component 310 and classify the network cell based at least in part on the estimated cell geometry. Other properties that can be utilized by the classification component 330 to distinguish a small cell from a macro cell can include, but are not limited to, cell antenna height, RSRP ranges associated with the cell, a downlink signal-plus-interference to noise ratio (SINR) for the cell, a transmit power range assigned to one or more UEs by the cell, a physical resource block (PRB) allocation utilized by the cell (e.g., a larger allocation of PRBs to a given UE can indicate a small cell due to a small cell typically serving a smaller number of UEs than a macro cell), and/or other types of information.

In an aspect, the classification component 330 can leverage one or more properties of various cell types, such as macro cells, micro cells, and pico cells, to classify a given cell as one of said cell types. For instance, system 300 can define transmit power ranges that are generally associated with macro cells and small cells, respectively, and these power ranges can be used by the classification component 330 in its computations. By way of specific, non-limiting example, system 300 can identify a first transmit power range, e.g., in decibel-milliwatts or dBm, for small cells (e.g., approximately 30 dBm to approximately 40 dBm) and a second transmit power range for macro cells (e.g., approximately 40 dBm to approximately 50 dBm). Based on the transmit power of a given cell as determined by the path loss estimation component 320 and/or the classification component 330, the classification component 330 can then utilize the transmit power ranges in its classification. For instance, with reference to the example ranges given above, the classification component could consider a cell with a transmit power of less than approximately 37 dBm as more likely to be a small cell while considering a cell with a transmit power of approximately 40 dBm or more as more likely to be a macro cell. In an aspect, this analysis can be combined with analysis based on other factors, such as path loss over distance, to arrive at a final classification for a given cell.

As another example, since a macro cell typically has a greater communication range than a small cell, the classification component 330 can utilize distance information in UE log data extracted by the data extraction component 310 in determining whether a given cell is a macro cell or a small cell. For instance, if a sample set obtained from UE log data for a given cell contains a high percentage of samples from a large distance from the cell (e.g., greater than approximately 400 m), the classification component 330 can consider the cell as more likely to be a macro cell. Conversely, if a relatively large percentage of samples for the cell are from a short distance from the cell (e.g., less than approximately 200 m or less than approximately 400 m), the classification component 330 can consider the cell as more likely to be a small cell.

As a further example, the classification component 330 can utilize path loss data generated by the path loss estimation component 320 to estimate path loss and/or received signal power at respective distances from a given cell in order to calculate a rate of increase of path loss versus distance for the cell. In one example, this rate of increase can be substantially logarithmic over all or part of the range of distances associated with the cell.

Figure 4:
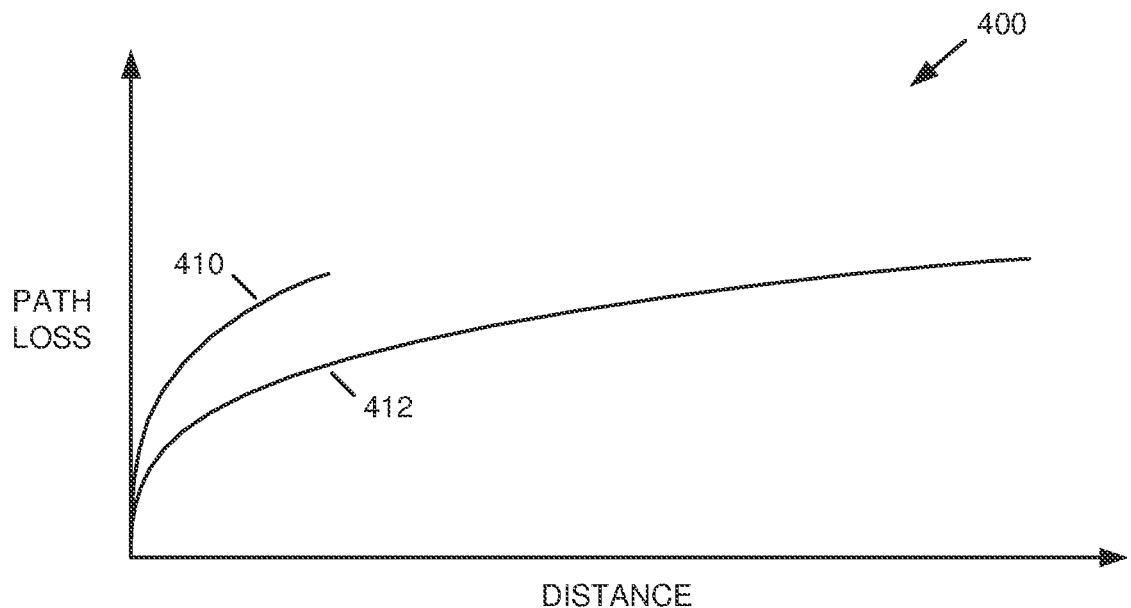
FIGS. 4-5 depict example cellular signal data that can be utilized for cell classification in accordance with various aspects described herein.

In an aspect, due to the generally larger range associated with macro cells, path loss can increase with distance more slowly in a macro cell than a similar small cell. By way of illustrative example, diagram 400 in FIG. 4 shows an example logarithmic regression that can be performed based on path loss samples at various distances. Here, two trend lines 410, 412 are used, which correspond to different cells in a cellular network. For clarity of illustration, diagram 400 has been simplified and does not show the individual samples used in computing the trend lines 410, 412. As shown by diagram 400, path loss increases with distance faster for the cell represented by trend line 410 than that for the cell illustrated by trend line 412. Accordingly, the classification component 330 can consider the cell corresponding to trend line 410 as more likely to be a small cell while considering the cell corresponding to trend line 412 as more likely to be a macro cell.

Figure 5:
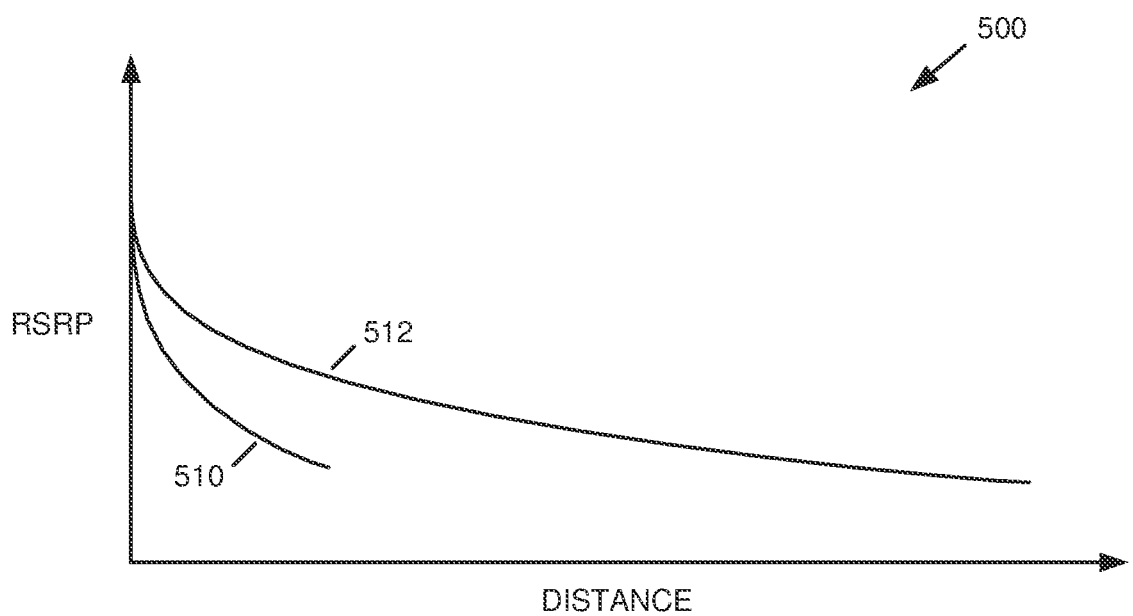

Similarly, the generally larger range associated with macro cells can cause the RSRP associated with a cell to decrease with distance more slowly in a macro cell than in a small cell. By way of another illustrative example, diagram 500 in FIG. 5 shows an example logarithmic regression that can be performed based on RSRP samples at various distances. Here, two trend lines 510, 512 are used, which correspond to different cells in a cellular network. For clarity of illustration, diagram 500 has been simplified and does not show the individual samples used in computing the trend lines 510, 512. As shown by diagram 500, RSRP decreases with distance faster for the cell represented by trend line 510 than that for the cell illustrated by trend line 512. Accordingly, the classification component 330 can consider the cell corresponding to trend line 510 as more likely to be a small cell while considering the cell corresponding to trend line 512 as more likely to be a macro cell.

Returning to FIG. 3, the data extraction component 310 can obtain raw UE log data, e.g., from one or more network logging devices 12 as collected via a drive test or other means, and transform the UE log data into cell level data and/or other suitable data types. By way of example, a drive test log can be constructed in a tabular format having rows corresponding to UE information obtained at a given timestamp. Respective rows of the drive test table can include various fields such as the following:

1) Timestamp
2) UE location, e.g., given as latitude/longitude
3) Frequency band (e.g., given as an EARFCN) used for measurement
4) Physical cell ID of the serving cell at the time of measurement
5) Signal quality associated with a serving cell at the time of measurement, e.g., given as RSRP and/or RSRQ
6) Cell ID of the serving cell at the time of measurement Other fields can also be utilized.

In an aspect, the data extraction component 310 can consult a cell database and/or other information sources to obtain additional information to supplement the UE log data. For instance, given a physical cell ID, cell ID, and/or EARFCN associated with a cell as reported in the UE log data, the approximate transmit power, location (e.g., given as latitude/longitude), antenna height, and/or other properties of the cell can be found via the cell database. Subsequently, the distance between the UE and its serving cell for each measurement can be computed based on the UE location data given by the UE log data as well as the cell location data given by the cell database. Additionally, the UE log data for a given UE location can be used in combination with domain knowledge to derive the path loss associated with that UE location. In an aspect, this can be calculated with respect to energy per resource element (EPRE) as follows:

$$\text{path loss}=EPRE-RSRP=TX \text{ power}-\log_{10}(\text{bandwidth} \times 5 \times 12)-RSRP.$$

As a result of the above and/or other operations, the data extraction component 310 can produce a set of tabular cell-level data. In an aspect, the cell-level data can include respective rows, and these rows can in turn include information such as UE location (e.g., given as latitude/longitude), RSRP (e.g., given in dBm), UE distance to its serving cell, path loss, residing cell transmit power (e.g., given in dBm), and/or other suitable information.

As noted above, the amount of UE log data that can be generated during a drive test and/or other similar operations can be significantly large, e.g., of a scale that cannot be analyzed by a human in a useful or reasonable timeframe. As a result, the classification component 330 can employ one or more machine learning algorithms to receive input UE log data and classify respective cells associated with the UE log data in an automated manner. This, in turn, allows network trends and/or other useful information to be derived from the UE log data, which can be utilized to improve network performance and/or provide other advantages or improvements to the operation of a cellular communication network that would be difficult or unfeasible to realize without use of the classification component 330 as described herein. Two examples of machine learning techniques that can be utilized by the classification component 330, namely a support vector machine (SVM) and a neural network, are provided herein. It should be appreciated, however, that these are merely examples of machine learning techniques that could be used and that other techniques are also possible. For instance, a machine learning algorithm based on a decision tree, a random forest, or the like could be used. Other algorithms and/or techniques are also possible.

Figure 6:
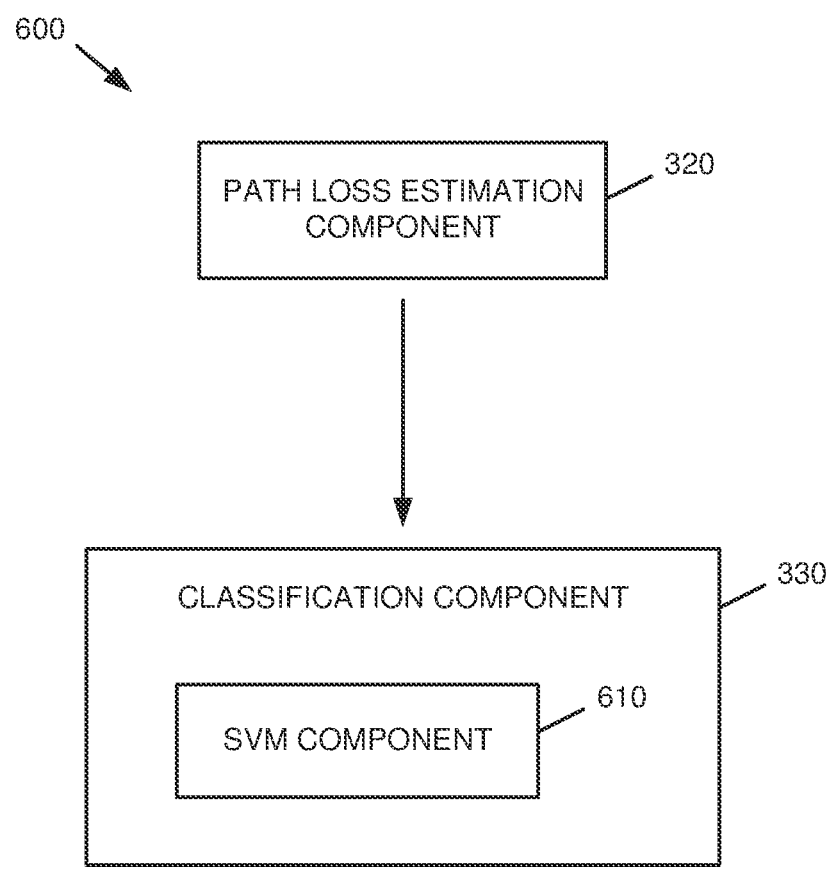
FIG. 6 is a block diagram of a system that facilitates small cell identification using a support vector machine in accordance with various aspects described herein.

Turning now to FIG. 6, a block diagram of a system 600 that facilitates small cell identification using an SVM in accordance with various aspects described herein is illustrated. Repetitive description of like elements employed in other embodiments described herein is omitted for sake of brevity. As shown by FIG. 6, system 600 includes a classification component 330 that can receive path loss data from a path loss estimation component 320 as described above. Also or alternatively, the classification component 330 can receive further information from other sources, such as the data extraction component 310 shown in FIG. 3.

In an aspect, the classification component 330 can include an SVM component 610 that can classify a cell given in associated log data as one of a group of types (e.g., as a macro cell or a small cell) using one or more SVM techniques. An example technique that can be employed by the SVM component 610 is provided below. It should be appreciated, however, that other techniques could also be used.

In an example, the SVM component 610 can generate a logarithmic regression to represent path loss vs. distance based on data provided by the path loss estimation component 320 and/or other sources. In an aspect, a logarithmic regression can be generated by the SVM component 610 to approximate the change of path loss with distance as a logarithmic curve, e.g., similar to that shown by the simplified example in FIG. 4. In one example, the SVM component 610 can determine a representative curve for the path loss data given by the path loss estimation component 320 in the form $y=\theta_1+\theta_2 \log_{10}x$, where $\theta_1$ represents an initial path loss and $\theta_2$ represents a rate of path loss change with distance. The parameters $\theta_1$ and $\theta_2$ corresponding to the curve can be estimated by the SVM component 610 from the given path loss data. In an aspect, this estimation can be done in two stages. More particularly, the SVM component 610 can compute the logarithmic regression and associated values for $\theta_1$ and $\theta_2$ in the first stage, and subsequently predict the path loss associated with a given cell at respective distances in the second stage.

Figure 7:
FIG. 7 depicts an example data structure that can be utilized by the system of FIG. 6 in accordance with various aspects described herein.

In an aspect, the SVM component 610 can record respective logarithmic regressions and corresponding predictions in a table, such as table 700 shown in FIG. 7, and/or another suitable data structure. Table 700 as shown in FIG. 7 can include rows containing information for respective network cells. Each row can contain information such as a cell index (which can be an index assigned by the network or a separate index used for purposes of table 700) and other information associated with the cell such as a cell transmit power and a cell frequency band. As further shown by table 700, respective rows can contain the values for $\theta_1$ and $\theta_2$ as computed by the SVM component 610, as well as predicted path loss (PL) values for respective distances based on $\theta_1$ and $\theta_2$. Here, values of 100 m, 500 m, and 1000 m are used, but it should be appreciated that other values could also be used. In an aspect, based on the predicted path loss values generated by the SVM component 610 as well as other available information for a given cell, the SVM component 610 can classify the cell as a macro cell or a small cell, e.g., using one or more considerations as described above.

In another aspect, the SVM component 610 can perform a similar analysis to that described above with respect to path loss to classify cell RSRP. Thus, for example, the SVM component 610 can generate values $\theta_1$ and $\theta_2$ for a logarithmic regression corresponding to RSRP for a given cell versus distance, based on which the SVM component 610 can generate estimates for the RSRP at various distances in a similar manner to that described above with respect to path loss. In one example, classification of a given cell based on RSRP can be dependent on the transmit power utilized by the cell since transmit power profiles can differ between different cells and/or cell operators.

Figure 8:
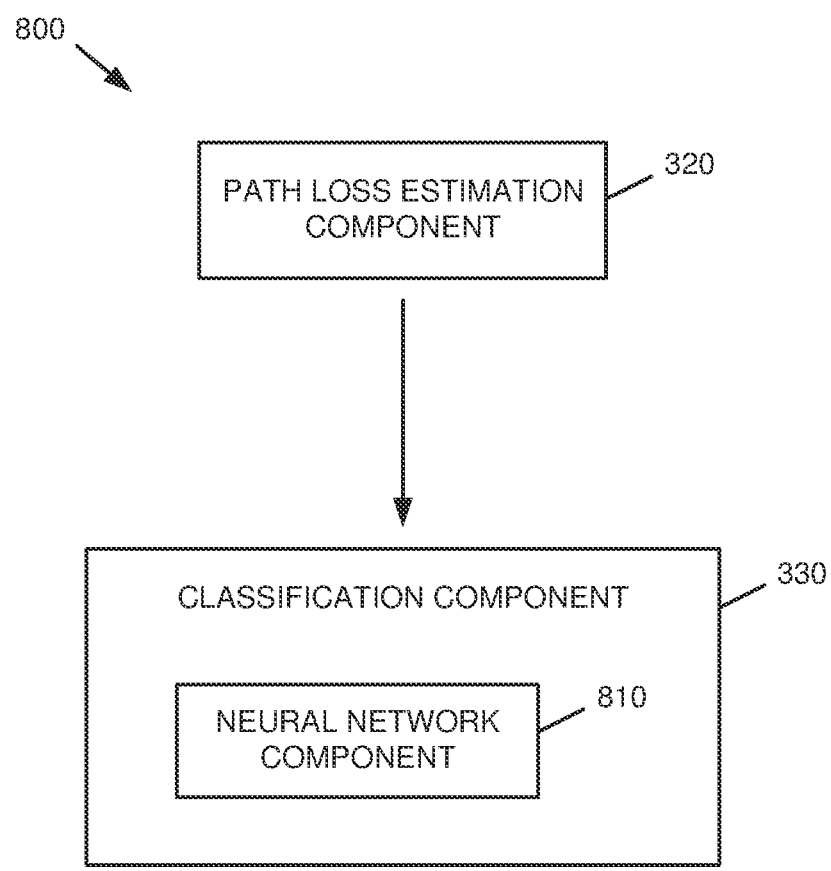
FIG. 8 is a block diagram of a system that facilitates small cell identification using a neural network in accordance with various aspects described herein.

With reference next to FIG. 8, a block diagram of a system 800 that facilitates small cell identification using a neural network in accordance with various aspects described herein is illustrated. Repetitive description of like elements employed in other embodiments described herein is omitted for sake of brevity. As shown by FIG. 8, system 800 includes a path loss estimation component 320 and a classification component 330 that can interact in a similar manner to that described above with respect to FIG. 6. In an aspect, the classification component 330 can include a neural network component 810 that can classify a cell given in associated log data as one of a group of types (e.g., as a macro cell or a small cell) using one or more neural network techniques. An example technique that can be employed by the neural network component 810 is provided below. It should be appreciated, however, that other techniques could also be used For instance, a machine learning algorithm based on a decision tree, a random forest, or the like could be used. Other algorithms and/or techniques are also possible.

In an aspect, the neural network component 810 can start operation by aggregating UE-level to cell-level information as described above into bins corresponding to respective distance ranges. The bins employed by the neural network component 810 can correspond to uniform distance ranges (e.g., 25-meter bins, 50-meter bins, etc.) or non-uniform ranges. In a specific, non-limiting example that employs 25-meter sized bins, the neural network component 810 can utilize average path loss over respective 25-meter intervals to populate the bins. Thus, for instance, average UE path loss associated with distances to a given cell between 0-25 meters can be assigned to a 25-meter bin, average UE path loss associated with distances to the cell between 25-50 meters can be assigned to a 50-meter bin, and so on. In an aspect, assignment of UE data to respective bins can be performed by, e.g., a distributed computing system operating via the Apache Hadoop software platform. Other techniques could also be used.

In an aspect, the neural network component 810 can record information corresponding to bins as described above in a table, such as table 900 shown in FIG. 9, and/or another suitable data structure. Table 900 as shown in FIG. 9 can include rows containing information for respective network cells. Each row can contain a cell index, transmit power, and frequency band in a similar manner to table 700 in FIG. 7. As further shown by table 900, respective rows can contain average path loss for respective bins, here 50-meter bins. While table 900 shows only bins corresponding to distances up to 250 m for brevity, it should be appreciated that any number of bins can be utilized by the neural network component 810 for any suitable number of corresponding distance ranges. For instance, table 900 could include additional bins for 50-meter intervals up to any suitable maximum distance (e.g., 1000 m, 2500 m, etc.).

Figure 10:
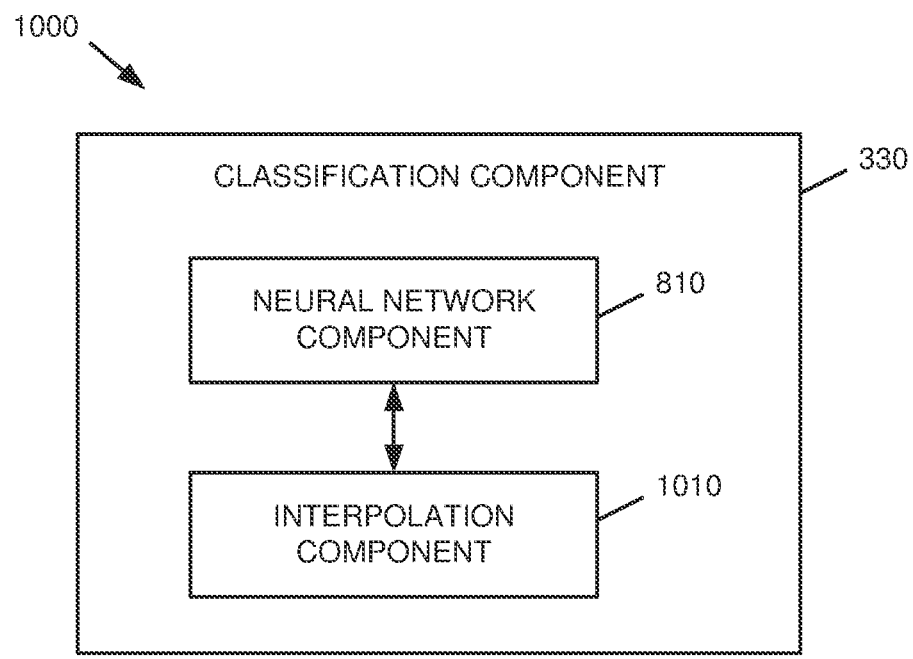
FIG. 10 is a block diagram of a system that facilitates interpolation of cell path loss data in accordance with various aspects described herein.

As shown by table 900, the neural network component 810 may be unable to populate each distance bin for each network cell, e.g., due to a lack of UE log data for a given cell at various ranges. Accordingly, values for which insufficient log data is present can initially be left blank in table 900. In order to provide a more complete estimate of cell performance at all available ranges, path loss for various ranges corresponding to a cell can be interpolated based on existing data for the cell at other ranges. With reference to FIG. 10, a system 1000 that assists the neural network component 810 by interpolating cell path loss data is illustrated. System 1000 includes an interpolation component 1010 that can be employed by the classification component 330 to interpolate missing data generated by the neural network component 810, e.g., corresponding to table 900. In an aspect, the interpolation component 1010 can utilize path loss information for a first distance (e.g., a first distance bin as shown by table 900) to interpolate other path loss information for a second distance (e.g., a second distance bin as shown by table 900) that is different than the first distance. As a result of performing interpolation on path loss data via the interpolation component 1010, respective missing data points in the path loss data can be estimated to facilitate more robust classification.

In an aspect, the interpolation component 1010 can utilize logarithmic interpolation to estimate missing bin values associated with the neural network component 810. An example technique that can be utilized by the interpolation component 1010 for logarithmic interpolation is described below. It should be appreciated, however, that other techniques for logarithmic interpolation, as well as different types of interpolation, could also be used.

In an aspect, logarithmic interpolation as performed by the interpolation component 1010 can be utilized to estimate missing path loss values (e.g., blank values as shown in table 900) between a set of known data points, e.g., two points $D_1$ and $D_2$ (e.g., corresponding to two different distance bins as described above) and their respective path loss values $p_1$ and $p_2$. By way of a non-limiting example that uses 25-meter bins, point $D_1$ can correspond to an x-meter bin and point $D_2$ can correspond to an (x+25y)-meter bin, where y is the number of missing data points between $D_1$ and $D_2$. In the event that no known point $D_1$ or $D_2$ exists, e.g., the missing data point is associated with a first bin or a last bin, an estimated initial or final path loss can be calculated, e.g., using logarithmic regression as described above and/or by other means.

Based on data points $D_1$ and $D_2$, the logarithmic slope for the segment between $D_1$ and $D_2$ can be found as follows:

$$\text{Slope} = (p_2 - p_1)/(\log_{10} d_2 - \log_{10} d_1),$$

where $d_1$ and $d_2$ are the distances (e.g., bin distances) associated with points $D_1$ and $D_2$, respectively.

Figure 11:
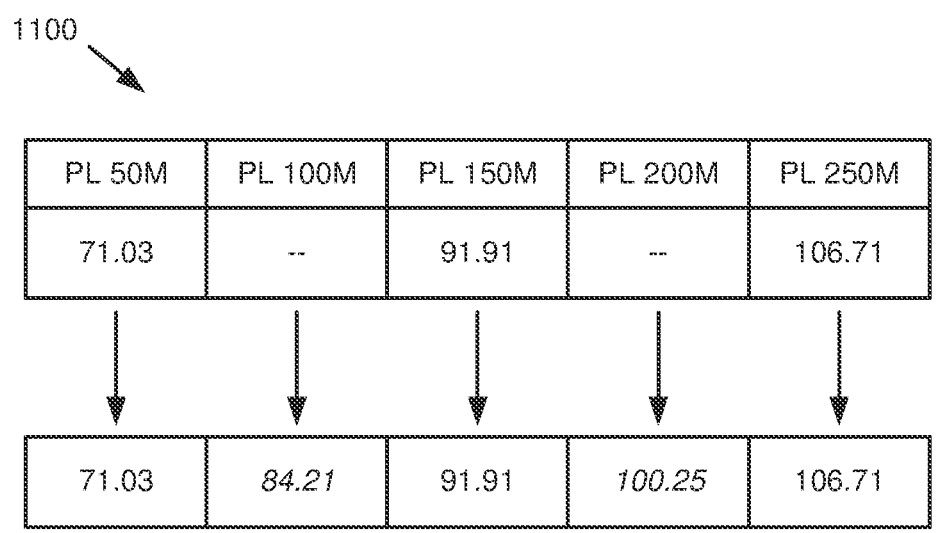
FIG. 11 depicts example interpolations that can be performed by the system of FIG. 10 in accordance with various aspects described herein.

Next, the path loss $p_m$ for a given data point $D_m$ between $D_1$ and $D_2$ can be given by the following:

$$p_m = p_1 + \text{Slope} \times (\log_{10} d_m - \log_{10} d_1)$$

where $d_m$ is the distance (e.g., bin distance) associated with point $D_m$. An example of logarithmic interpolation that can be performed in the above manner for a set of data points is shown by diagram 1100 in FIG. 11.

In an aspect, the above logarithmic interpolation technique can be utilized by the interpolation component 1010 since path loss in a cellular communication network can exhibit path loss as a per-decade (e.g., based on login) property. Additionally, use of the neural network component 810 and the interpolation component 1010 as described herein can result in increased accuracy of path loss estimation by accounting for non-uniform rates of path loss change with distance, since the rate at which path loss changes with distance for a given cell may not be uniform for all distance ranges.

While the above description relates to the specific, non-limiting example of logarithmic interpolation, it should be appreciated that other types of interpolation could also be used by the interpolation component 1010. For instance, the interpolation could use linear interpolation, quadratic interpolation, exponential interpolation, and/or any other suitable technique(s).

Returning again to FIG. 3, regardless of the machine learning approach employed by the classification component 330, the classification component 330 can utilize a training set to train the machine learning algorithm(s) used as well as any respectively corresponding models. In an aspect, a training set utilized by the classification component 330 can include drive test data and/or other UE log data that corresponds to respective cells with known classifications. However, because there are generally more macro cells deployed in cellular communication networks than small cells, and because macro cells have a greater range than small cells, a training set corresponding to UE log data can in some cases be significantly skewed toward samples for macro cells. This, in turn, can impact the prediction accuracy of the classification component 330. In order to balance samples of a training set obtained via UE log data between macro cells and small cells, oversampling can be performed on the cell-level data that is generated as described above by creating duplicate or "artificial" small cells. Cell duplication in this manner can be performed such that the ratio of macro cells to small cells in the training set is approximately any desired ratio (e.g., 1:1, 2:1, etc.). In order to increase the generality of the duplicated small cell data, modifications can be made to the cell-level data for the duplicate cells. In an aspect, modifications made in this manner can be sufficiently minor such that the path loss signature of the cells is maintained while still improving the robustness of the training set.

By way of specific, non-limiting example, a set of cell-level training data can include 40 bins that encompass respective 25-meter bins between 0m and 1000 m. To improve the generality of the training data, for each 2.5% of the training samples, a path loss corresponding to one of the 40 bins can be increased or decreased by a small amount (e.g., 0.1 dB), thereby modifying each of the bins in the training set an approximately equal amount of times. In an aspect, modification in this manner to a single bin enables the training data to be more generalized and abundant without changing the cell types represented by the path loss. With respect to the above example, it should be appreciated that any number of samples and/or bins could also be used, provided that the bins in the training data are modified substantially equally.

In another aspect, the relationship between path loss and distance can vary for different frequencies. As a result, the classification component 330 can further utilize frequency information to improve performance of the machine learning technique(s) employed by the classification component 330. In one example, the classification can utilize a mapping between EARFCN and frequency to obtain frequency data for cells having a known EARFCN. Table 1 below illustrates an example EARFCN to frequency mapping that can be utilized for respective cells in a cellular communication network. It should be appreciated that respective frequencies derived from EARFCN data need not precisely match with the center frequency of the corresponding cell(s) provided that the frequency mapping can enable the classification component 330 to distinguish between low, mid, and high frequency bands.

TABLE 1

EARFCN to frequency mapping for an example cellular network.

| EARFCN | Frequency (MHz) |
| --- | --- |
| 650 | 1900 |
| 850 | 1900 |
| 975 | 1900 |
| 1150 | 1900 |
| 1975 | 2100 |
| 2000 | 2100 |
| 2050 | 2100 |
| 2175 | 2100 |
| 5230 | 700 |
| 5780 | 700 |
| 9820 | 2300 |

As noted above, the classification component 330 can utilize path loss and/or signal strength data in combination with other types of network data to improve cell classification performance By way of example, the data extraction component 310 shown in FIG. 1 can extract transmit power data for a cell based on UE log data and/or other information, and the classification component 330 can classify the cell (e.g., as a macro cell or a small cell) based at least in part on the transmit power data. As another example, the data extraction component 310 can estimate a geometry of a cell based on UE log data and/or other information for the cell, and the classification component 330 can classify the cell based at least in part on the estimated cell geometry. As a further example, the data extraction component 310 can extract or otherwise determine distance data from the UE log data, such as a maximum distance from the cell as given by a sample in the UE log data and/or a percentage of samples given in the UE log data that indicate distances within a threshold distance from the cell (e.g., within 300 m, within 500 m, etc.), and the classification component 330 can classify the cell based at least in part on the distance data. As still another example, the data extraction component 310 can identify an antenna transmission frequency associated with the cell from the UE log data, and the classification component 330 can classify the cell based at least in part on the antenna transmission frequency. Other forms of supplemental information, including those described above and/or other types of supplemental information, are also possible.

Figure 12:
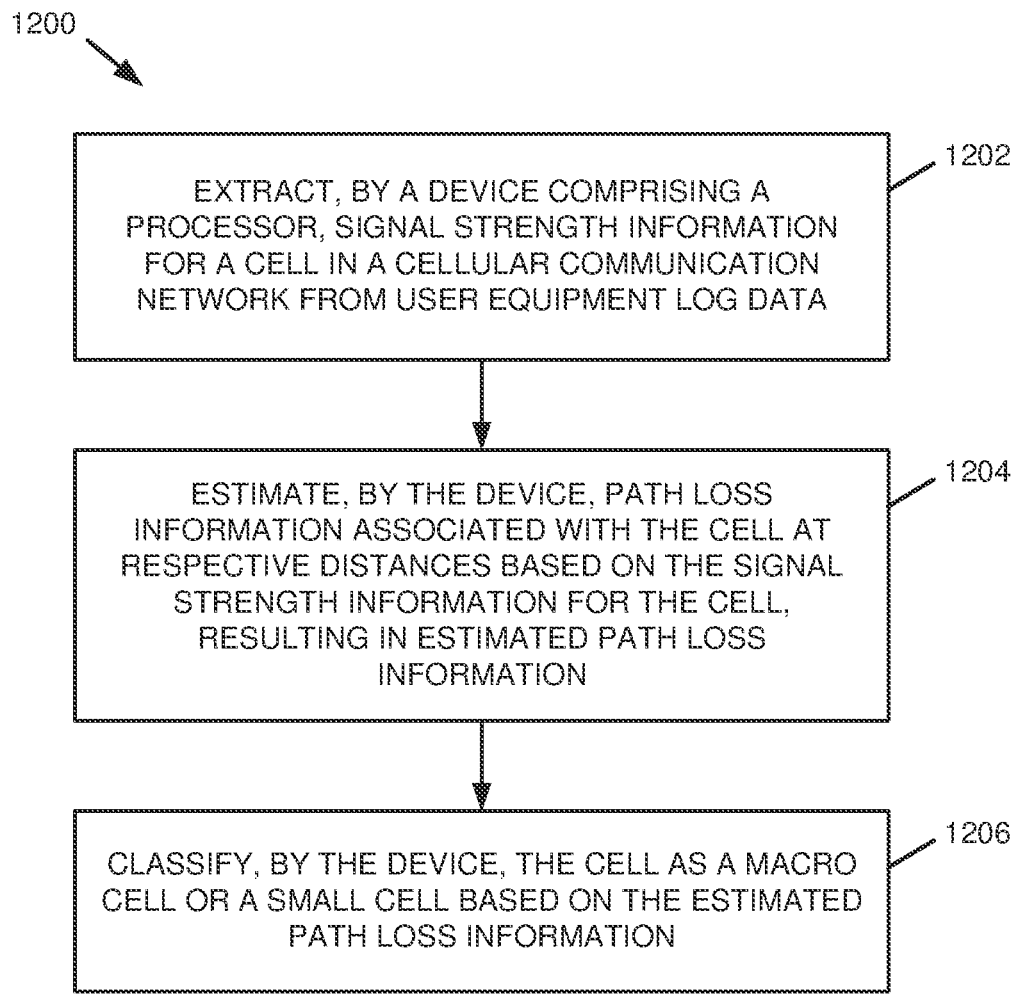
FIG. 12 is a flow diagram of a method for small cell classification using machine learning in accordance with various aspects described herein.

FIG. 12 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 12, a flow diagram of a method 1200 for small cell classification using machine learning is presented. At 1202, a device comprising a processor (e.g., a device of a cell classification system 110 comprising a processor 210) can extract (e.g., by a data extraction component 310) signal strength information for a cell (e.g., a cell 10) in a cellular communication network from UE log data (e.g., data collected by one or more network logging devices 12).

At 1204, the device can estimate (e.g., by a path loss estimation component 320) path loss information associated with the cell at respective distances based on the signal strength information for the cell as extracted at 1202, resulting in estimated path loss information.

At 1206, the device can classify (e.g., by a classification component 330) the cell, e.g., as a macro cell or a small cell, based on the estimated path loss information obtained at 1204.

Figure 13:
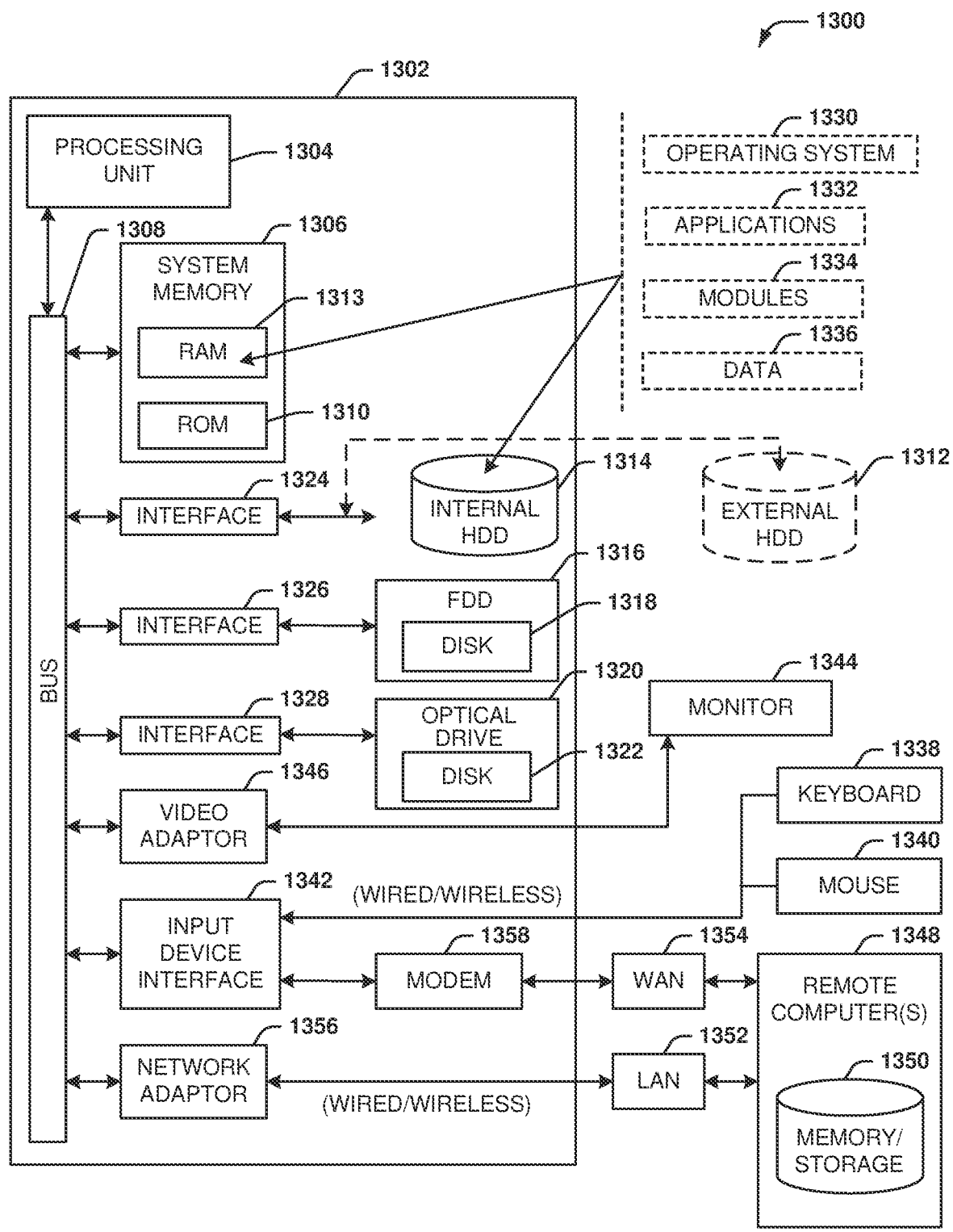
FIG. 13 depicts an example computing environment in which various embodiments described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). While the internal HDD 1314 is illustrated as located within the computer 1302, the internal HDD 1314 can also be configured for external use in a suitable chassis (not shown). The HDD 1314, magnetic FDD 1316 and optical disk drive 1320 can be connected to the system bus 1308 by an HDD interface 1324, a magnetic disk drive interface 1326 and an optical drive interface 1328, respectively. The interface 1324 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a USB port, an IR interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless access point (AP) disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
using regression data representative of a logarithmic regression based on estimated path loss information associated with a cell enabled via a cellular communication network, determining, by a device comprising a processor, a rate of increase of path loss relative to distance for the cell, resulting in a determined rate of increase of path loss; and
based on the determined rate of increase of path loss, classifying, by the device, the cell as a type from a group of types of cells, the group comprising a macro cell and a small cell.

2. The method of claim 1, wherein the classifying comprises classifying the cell as the type from the group using a support vector machine.

3. The method of claim 1, wherein the classifying comprises classifying the cell as the type from the group using a neural network.

4. The method of claim 1, further comprising:
estimating, by the device, the estimated path loss information associated with the cell at respective distances from the cell based on signal strength information for the cell.

5. The method of claim 4, wherein the estimated path loss information comprises a first estimated path loss for a first distance of the respective distances and a second estimated path loss for a second distance of the respective distances that is different from the first distance, and wherein the estimating comprises interpolating the second estimated path loss based on the first estimated path loss.

6. The method of claim 1, wherein the classifying comprises classifying the cell as the type from the group further based on a transmit power associated with the cell.

7. The method of claim 1, wherein the classifying comprises classifying the cell as the type from the group further based on an estimated cell geometry for the cell.

8. The method of claim 1, further comprising:
determining, by the device, a maximum distance from the cell as given by a sample in user equipment log data received from a user equipment, wherein the classifying comprises classifying the cell further based on the maximum distance.

9. The method of claim 1, further comprising:
determining, by the device, a percentage of samples given in user equipment log data received from a user equipment that indicate sample distances within a threshold distance from the cell, wherein the classifying comprises classifying the cell further based on the percentage of samples.

10. The method of claim 1, wherein the classifying comprises classifying the cell as the type from the group further based on an antenna transmission frequency associated with the cell.

11. A system, comprising:
a processor; and
a memory that stores executable instructions that, when executed by the processor, facilitate performance of operations, the operations comprising:
deriving a path loss increase rate relative to distance for a cell in a cellular communication network via logarithmic regression based on estimated path loss information for the cell, resulting in a derived path loss increase rate; and
based on the derived path loss increase rate, classifying the cell as one from a group of types of cells, the group comprising a macro cell and a small cell.

12. The system of claim 11, wherein the classifying comprises classifying the cell as one from the group using a neural network.

13. The system of claim 11, wherein the operations further comprise:
determining the estimated path loss information associated with the cell at respective distances from the cell based on signal strength information for the cell.

14. The system of claim 13, wherein the estimated path loss information comprises a first estimated path loss for a first distance of the respective distances and a second estimated path loss for a second distance of the respective distances that is different from the first distance, and wherein determining the estimated path loss information comprises interpolating the second estimated path loss based on the first estimated path loss.

15. The system of claim 11, wherein the classifying comprises classifying the cell as the one from the group further based on transmit power data associated with the cell.

16. The system of claim 11, wherein the classifying comprises classifying the cell as the one from the group further based on an estimated cell geometry of the cell.

17. A non-transitory machine-readable medium, comprising executable instructions that, when executed by a processor, facilitate performance of operations, comprising:
    modeling a rate of increase of path loss versus distance for a network cell using a result of a logarithmic regression applied to estimated path loss information for the network cell, resulting in a modeled rate of path loss increase; and
    based on the modeled rate of path loss increase, classifying the network cell as a type from a group of types of network cells, the group comprising a macro cell and a small cell.

18. The non-transitory machine-readable medium of claim 17, wherein the classifying comprises classifying the network cell as the type from the group using a neural network.

19. The non-transitory machine-readable medium of claim 17, wherein the operations further comprise:
    determining the estimated path loss information for the network cell at respective distances from the network cell based on signal strength information for the network cell.

20. The non-transitory machine-readable medium of claim 19, wherein the estimated path loss information comprises first estimated path loss information corresponding to a first distance of the respective distances and second estimated path loss information corresponding to a second distance of the respective distances that is different from the first distance, and wherein determining the estimated path loss information comprises interpolating the second estimated path loss information based on the first estimated path loss information.

* * * * *